United States Patent
Keller

(10) Patent No.: US 11,485,050 B2
(45) Date of Patent: Nov. 1, 2022

(54) METHOD FOR PRODUCING A TRIM PART FOR VEHICLES, USING A TEMPORARY SEAL

(71) Applicant: HIB Trim Part Solutions GmbH, Bruchsal (DE)

(72) Inventor: Bernd Keller, Walzbachtal-Jöhlingen (DE)

(73) Assignee: HIB Trim Part Solutions GmbH, Bruchsal (DE)

( * ) Notice: Subject to any disclaimer, the term of this patent is extended or adjusted under 35 U.S.C. 154(b) by 113 days.

(21) Appl. No.: 16/648,015

(22) PCT Filed: Aug. 27, 2018

(86) PCT No.: PCT/EP2018/073045
§ 371 (c)(1),
(2) Date: Mar. 17, 2020

(87) PCT Pub. No.: WO2019/052799
PCT Pub. Date: Mar. 21, 2019

(65) Prior Publication Data
US 2020/0269471 A1    Aug. 27, 2020

(30) Foreign Application Priority Data
Sep. 18, 2017   (DE) .................... 10 2017 121 558.1

(51) Int. Cl.
*B29C 45/16* (2006.01)
*B29C 33/00* (2006.01)
(Continued)

(52) U.S. Cl.
CPC ........ *B29C 33/0038* (2013.01); *B29C 33/005* (2013.01); *B29C 39/10* (2013.01);
(Continued)

(58) Field of Classification Search
CPC .............. B29C 39/10; B29C 45/14418; B29C 2045/14459; B29C 2045/14934;
(Continued)

(56) References Cited

U.S. PATENT DOCUMENTS 5,525,179 A * 6/1996 Stickling ............. B29C 45/1671
264/254
6,551,540 B1 * 4/2003 Porter ................. B29C 45/1635
264/255

(Continued)

FOREIGN PATENT DOCUMENTS

| DE | 19824463 A1 | 12/1999 |
| DE | 102004059066 A1 | 6/2006 |
| EP | 2149443 | * 2/2010 |

OTHER PUBLICATIONS

International Search Report (in English and German) and Written Opinion (in German) dated Dec. 14, 2018 in corresponding PCT Application No. PCT/EP2018/073045; ISA/EP.

*Primary Examiner* — Edmund H Lee
(74) *Attorney, Agent, or Firm* — Harness, Dickey & Pierce, P.L.C.

(57) ABSTRACT

The invention relates to a method for producing a trim part (10) for vehicles, using an injection mold (1), in which an edge of a carrier substrate is formed by the surface cover layer (8) reaching around said edge by means of a lost seal molded to the carrier substrate.

12 Claims, 3 Drawing Sheets

(51) Int. Cl.
*B29C 39/10* (2006.01)
*B29C 45/14* (2006.01)
*B29L 31/30* (2006.01)

(52) U.S. Cl.
CPC .... *B29C 45/14418* (2013.01); *B29C 45/1635* (2013.01); *B29C 45/1675* (2013.01); *B29C 45/1676* (2013.01); *B29C 2045/14459* (2013.01); *B29C 2045/14934* (2013.01); *B29L 2031/3005* (2013.01)

(58) Field of Classification Search
CPC ............ B29C 45/1635; B29C 45/1676; B29C 2045/1673; B29C 45/1675
See application file for complete search history.

(56) References Cited

U.S. PATENT DOCUMENTS

| | | | | |
|---|---|---|---|---|
| 6,558,599 | B1* | 5/2003 | Bethune | B29C 37/0028 |
| | | | | 264/255 |
| 7,784,844 | B2* | 8/2010 | Sato | B29C 45/1635 |
| | | | | 296/24.34 |
| 8,047,827 | B2* | 11/2011 | Okahara | B29C 45/1679 |
| | | | | 264/328.8 |
| 8,287,789 | B2* | 10/2012 | Zollner | B29C 45/1679 |
| | | | | 264/255 |
| 2002/0041914 | A1 | 4/2002 | Wagner | |
| 2005/0227043 | A1* | 10/2005 | Schoemann | B29C 45/16 |
| | | | | 428/137 |
| 2007/0207289 | A1* | 9/2007 | Cowelchuk | B60R 13/0237 |
| | | | | 428/141 |
| 2007/0207292 | A1* | 9/2007 | Cowelchuk | B29C 45/1676 |
| | | | | 428/174 |
| 2009/0280343 | A1 | 11/2009 | Wellen et al. | |
| 2013/0095287 | A1* | 4/2013 | Suzuki | B29C 45/1675 |
| | | | | 428/136 |
| 2019/0316390 | A1* | 10/2019 | Wilke | E05B 85/12 |

* cited by examiner

METHOD FOR PRODUCING A TRIM PART FOR VEHICLES, USING A TEMPORARY SEAL

CROSS-REFERENCE TO RELATED APPLICATIONS

This application is a National Stage of International Application No. PCT/EP2018/073045, filed on 27 Aug. 2018 and published in German as WO 2019/052799 on Mar. 21, 2019. This application claims priority to German Application No. 10 2017 121 558.1, filed on Sep. 18, 2017. The entire disclosures of all of the above applications are incorporated herein by reference.

FIELD

The disclosure relates to a method for producing a trim part for vehicles, using an injection mold.

When producing trim parts, in particular trim parts for a dashboard or the interior panels of vehicles, decorative layers such as wood veneers are applied to a base element. Then they are coated with a lacquer layer or polyurethane layer. The sealing of the polyurethane layer is carried out in the tool by pre-molding the base element or passing over the base element. However, an edge of the base element always remains visible. This is due to lateral coverage of the edge portion of the base element cannot be ensured. This means that a side view reflects the layered structure of base element, decorative layer and polyurethane layer as a sandwich structure. In some designs, this may be desired as a stylistic element. However, it is usually preferred that the layered structure is not visible in the side view.

SUMMARY

The problem underlying the disclosure therefore is to provide a method where a trim part can be produced with the edge portion of which is formed such that the layer structure is not recognizable.

This problem is solved by, a method for producing a trim part for vehicles using an injection mold, comprising: a carrier substrate created in a tool cavity of the injection mold from a first plastic material. A lost seal is injection molded from a second plastic material along an edge section of the carrier substrate positioned at a distance to an edge of the carrier substrate. Thus, the edge of the carrier substrate is exposed. The second plastic material is different from the first plastic material. The second plastic material forms a detachable bond with the first plastic material. A sealing cavity is generated between the carrier substrate and a tool component of the injection mold. A surface cover layer is inserted into the sealing cavity on the carrier substrate. The cover layer reaching behind the edge of the substrate. The injection mold is opened and the trim part is removed. The lost seal is removed from the carrier substrate.

According to the disclosure, a lost seal is molded to the component to be produced within the injection mold. The term "lost seal" expresses that this seal is used only temporarily and is removed in the course of executing the method according to the disclosure. A separate lost seal is molded onto the respective carrier substrate for each component produced.

The use of different plastic materials for the substrate and the lost seal is expressly carried out in such a way that the two materials specifically do not form a permanent bond. For this purpose, in an advantageous embodiment, the first plastic material of the carrier substrate is made of a plastic mixture of polycarbonates and acrylonitrile butadiene styrene (PC/ABS), acrylonitrile butadiene styrene and polyamide (ABS/PA) or polycarbonate (PC). The second plastic material of the lost seal is made of an olefinic thermoplastic containing a proportion of wax, in particular polyethylene (PE) or polypropylene (PP).

The sealing cavity, generated during the method, between the carrier substrate and the tool component of the injection mold is confined by the lost seal along the edge portion of the carrier substrate. Thus, the desired distance to the edge is maintained. The sealing cavity is formed at the edge of the carrier substrate such that it reaches behind the edge on two sides. The distance determines the length by which the surface cover layer extends from the visible surface beyond the edge at an angle, thereby covering the edge. The distance or length is set so that the layer structure of the trim part to be produced is no longer recognizable in a side view. When producing the sealing cavity, the tool component and the lost seal engage with each other in a sealing manner. For this purpose, the tool component moves against the seal.

In one embodiment of the method, a decorative layer, for example, foils, paper, (wood) veneers, aluminum, carbon fiber, etc. is inserted between the carrier substrate and the surface cover layer. In one embodiment, the decorative layer extends exclusively on a visible top of the carrier substrate. In an alternative embodiment, the decorative layer is routed around the edge of the carrier substrate in the direction of the lost seal. The surface cover layer can be designed to be crystal clear or colored.

In a further development of the method, the first plastic material, for the carrier substrate, has a fiber glass content of up to 30%. This increases the stiffness and strength.

Furthermore, in one advantageous embodiment, the method includes the surface cover layer applied to the carrier substrate using a Reaction Injection Molding (RIM) method.

In one embodiment, the removing from the mold is performed as a two-stage removal process. The trim part is first removed from the mold. The lost seal is removed from the carrier substrate. Alternatively, the seal can also be manually or automatically removed after the end of the process.

A further development of the method provides that a functional surface at least oriented toward the sealing cavity is integrated into the lost seal. The functional surface serves as a separating surface between the trim part and the injection mold. The functional surface may be formed, for example, as a protrusion or as excess material oriented toward the tool component along the lost seal. The material is plastically deformed by pressing the tool component into place to create an improved seal. The excess material can also be specially shaped, for example with a triangular cross-section. The tip is oriented toward the tool component. Such a protrusion preferably has a size of approximately 0.5 mm. Additional measures to ensure sealing, for example on the tool component, become unnecessary by integrating the functional surface into the lost seal.

The disclosure further comprises any trim part produced according to any one of the above described methods.

DRAWINGS

Other advantageous further developments of the disclosure are included in the dependent claims and/or are presented in more detail below together with the description of the preferred embodiment of the disclosure on the basis of the figures.

DETAILED DESCRIPTION

The figures are schematic, exemplary representations. Identical reference numbers refer to identical components in all views.

Figure 1:
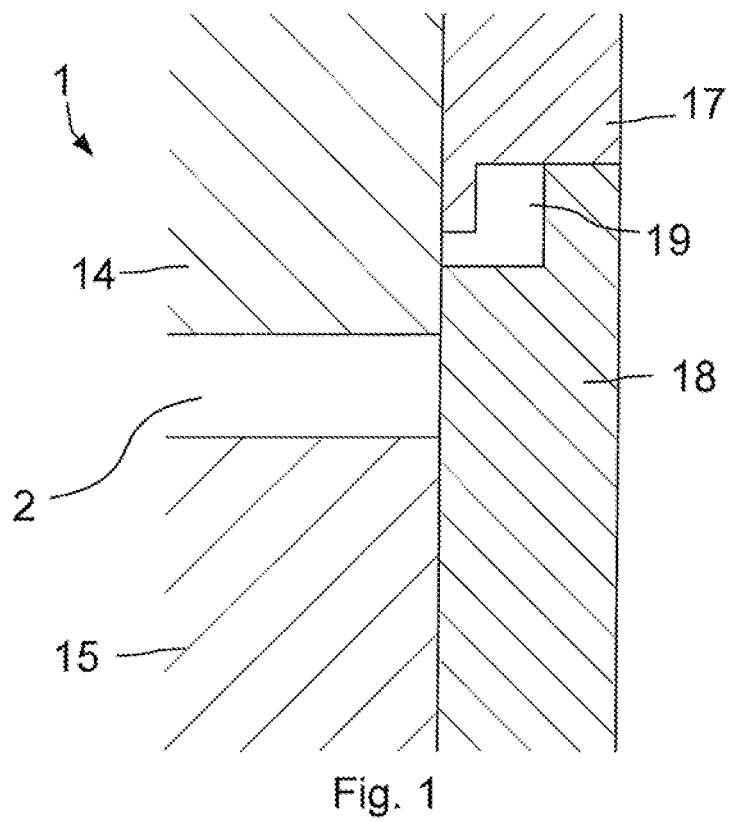
FIG. 1 is a cross section view of a first method step of the injection mold.
Figure 2:
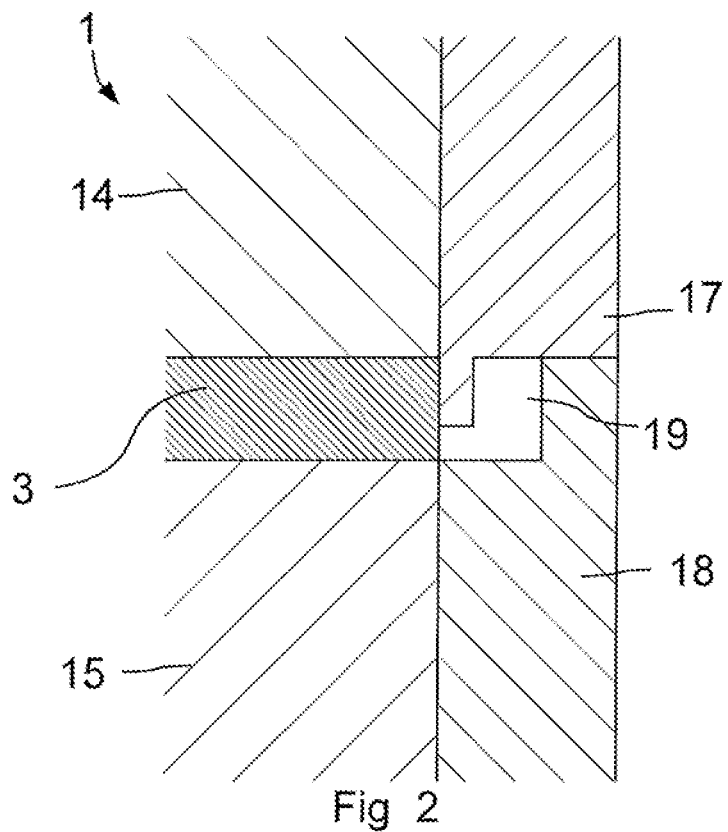
FIG. 2 is a cross section view of a second method step of the injection mold.

FIGS. 1-5 show an exemplary embodiment of the method for producing a trim part 10 using an injection mold 1. The injection mold 1 has several tool components 14, 15, 17, 18, that are movable relative To each other. A tool cavity 2 is formed by the tool parts 14, 15. The carrier substrate 3 is molded into the cavity 2, as shown in FIGS. 1 and 2. The carrier substrate 3 is formed from the first plastic material. In particular, the material from a plastic mixture of polycarbonates and acrylonitrile butadiene styrene (PC/ABS), acrylonitrile butadiene styrene and polyamide (ABS/PA) or polycarbonate (PC).

Figure 3:
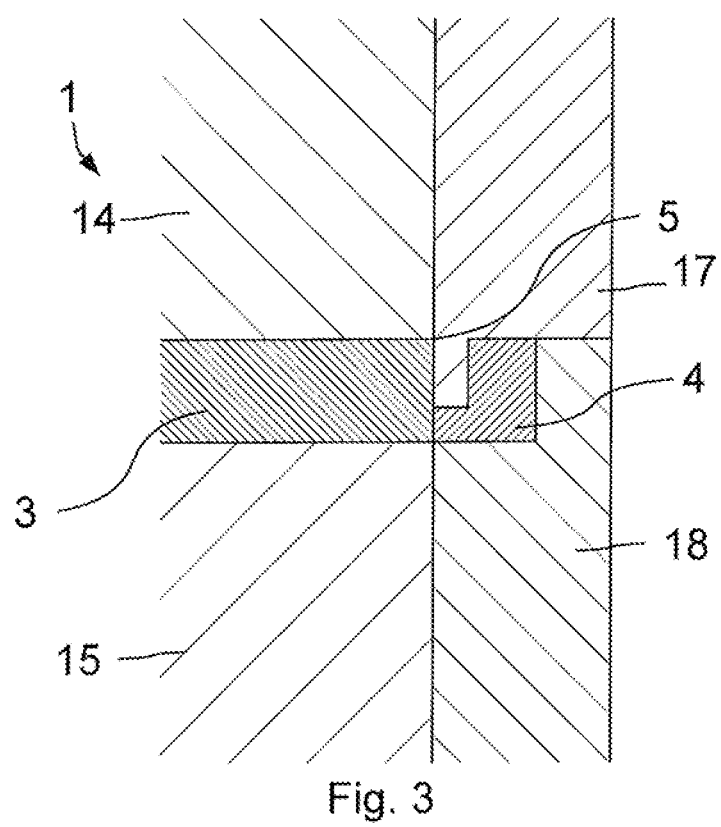
FIG. 3 is a cross section view of a third method step of the injection mold.

The tool components 17, 18 forming a tool cavity 19 are moved, from a second side, to the level of the carrier substrate 3. Subsequently the lost seal 4 is molded to the carrier substrate 3 from a second plastic material. In particular the second material is an olefinic thermoplastic, in particular Polyethylene (PE) or polypropylene (PP). The two plastic materials of the carrier substrate 3 and the lost seal 4 form a temporary, detachable connection. Thus, the lost seal 4 can be used as a functional body in the production process. The lost seal 4 is molded along the edge portion positioned at a distance to the edge 5 of the carrier substrate 3. Thus, the edge 5 of the carrier substrate 3 is exposed on two sides (top surface and side surface) in adjacent edge portions, as shown in FIG. 3. The tool components 14, 15, 17, 18 are closed during this step. Even if it is not recognizable in the section view shown in the drawing, the seal 4 extends along a total length of the carrier substrate 3.

Figure 4:
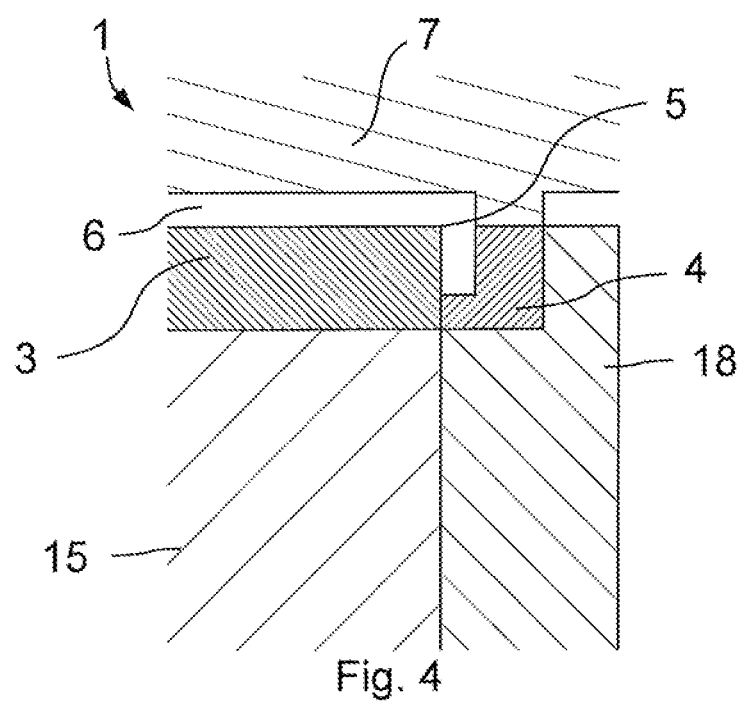
FIG. 4 is a cross section view of a fourth method step of the injection mold.
Figure 5:
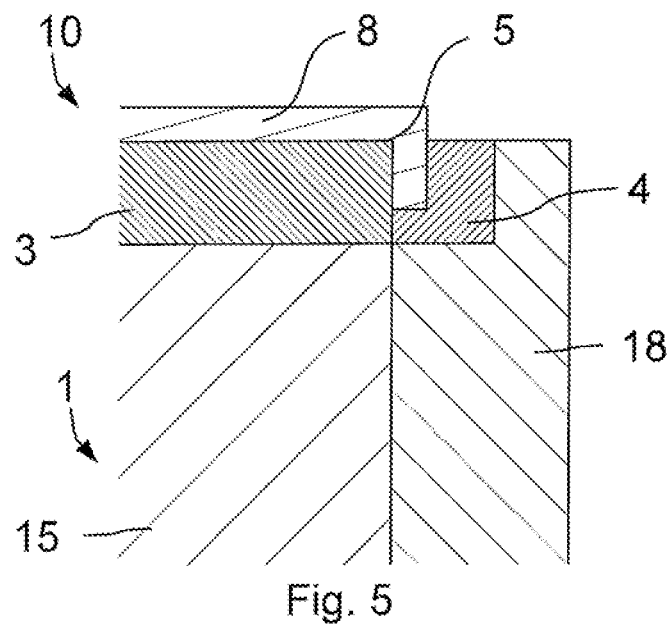
FIG. 5 is a cross section view of a fifth method step of the injection mold.

Subsequently, the tool parts 14, 17 are opened and moved away. Alternatively, the carrier substrate 3 is rotated along with the molded seal 4. Thus, the tool component 7 is brought into a sealing contact with the lost seal 4, as shown in FIG. 4. The the sealing cavity 6 is generated between the carrier substrate 3, the tool component 7 of the injection mold 1 and the seal 4, as shown in FIG. 4. In the sealing cavity 6, the surface cover layer 8 is applied to the carrier substrate 3 and its edge 5 using the reaction injection molding process (RIM). Thus, the cover layer reaches around the edge, and is then cured. Subsequently, the injection mold 1 is opened and the trim part 10 is removed, as shown in FIG. 5. Therein, the lost seal 4 can be removed from the carrier substrate 3 at the same time.

Figure 6:
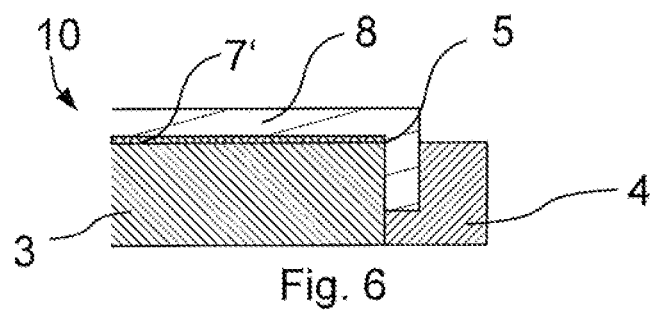
FIG. 6 is a cross section view of a trim part removed from the mold, with a still connected seal.

FIG. 6 shows an alternative embodiment of the method. Here the seal 4 is still attached to the carrier substrate 3 after the trim part 10 is removed. Then the seal is removed outside of the injection mold 1. Additionally, a decorative layer 7', extending to the edge 5, is applied on the carrier substrate 3, in this embodiment, before the surface cover layer 8 is applied using the RIM process. Thus, the cover layer reaches around the edge 5. Correspondingly, this can be integrated into the method according to FIGS. 1-5. The decorative layer 7' is applied to the molded carrier substrate 3. The surface cover layer 8 can be designed crystal clear. Thus, the decorative layer 7' remains recognizable.

Figure 7:
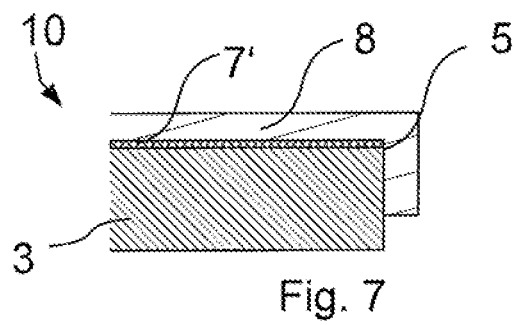
FIG. 7 is a cross section view of a finished trim part removed from the mold.

FIG. 7 shows the finished trim part 10 with the carrier substrate 3 made of the first plastic material. The decorative layer 7' and the surface layer 8 reach around the edge 5.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for producing a trim part for vehicles using an injection mold comprising the steps of:
   a. Creating a carrier substrate in a tool cavity of the injection mold from a first plastic material;
   b. Injection molding a lost seal from a second plastic material along an edge section of the carrier substrate positioned at a distance to an edge of the carrier substrate, such that the edge of the carrier substrate is exposed, wherein the second plastic material is different from the first plastic material and is designed to form a detachable bond with the first plastic material;
   c. Generating a sealing cavity between the carrier substrate and a tool component of the injection mold by bringing the tool component and the lost seal into sealing contact while the sealing cavity is generated;
   d. Injection molding a surface cover layer into the sealing cavity on the carrier substrate, the cover layer reaching behind the edge of the substrate;
   e. Opening the injection mold and removing the trim part with the cover layer on the carrier substrate, wherein the lost seal is removed from the carrier substrate.

2. The method according to claim 1, wherein the tool component and lost seal confine the sealing cavity at least in sections.

3. The method according to claim 1, wherein a decorative layer is inserted between the carrier substrate and the surface cover layer.

4. The method according to claim 1, wherein the first plastic material of the carrier substrate is formed from a plastic mixture of polycarbonates and acrylonitrile butadiene styrene (PC/ABS), acrylonitrile butadiene styrene and polyamide (ABS/PA) or polycarbonate (PC).

5. The method according to claim 1, wherein the second plastic material of the lost seal is formed from an olefinic thermoplastic, polyethylene (PE) or polypropylene (PP).

6. The method according to claim 1, wherein the first plastic material has a fiber glass content of up to 30%.

7. The method according to claim 1, wherein the sealing cavity is formed so that it reaches around the edge of the carrier substrate on two sides.

8. The method according to claim 1, wherein the surface cover layer is applied to the carrier substrate using a Reaction Injection Molding (RIM) method.

9. The method according to claim 1, wherein removing the mold is performed as a two-stage removal process, the trim part is first removed from the mold and then the lost seal is removed from the carrier substrate.

10. The method according claim 1, further comprising a functional surface at least oriented toward the sealing cavity, is integrated into the lost seal, the functional surface serves as a separating surface between the trim part and the injection mold.

11. The method according to claim 10, wherein the lost seal has a protrusion of material that is plastically deformable by the tool component for generating the functional surface.

12. The method according to claim 1, wherein a new lost seal is molded for each trim part.

\* \* \* \* \*